United States Patent
Butters

(10) Patent No.: US 9,824,717 B2
(45) Date of Patent: Nov. 21, 2017

(54) ADJUSTING OCCUPANCIES OF A SET OF BUFFERS

(71) Applicant: Snell Advanced Media Limited, Reading, Berkshire (GB)

(72) Inventor: Jeff Butters, Reading (GB)

(73) Assignee: Snell Advanced Media Limited, Reading, Berkshire (GB)

( * ) Notice: Subject to any disclaimer, the term of this patent is extended or adjusted under 35 U.S.C. 154(b) by 304 days.

(21) Appl. No.: 14/521,598

(22) Filed: Oct. 23, 2014

(65) Prior Publication Data
US 2015/0161145 A1    Jun. 11, 2015

(30) Foreign Application Priority Data
Dec. 10, 2013 (GB) .................................. 1321827.6

(51) Int. Cl.
*G06F 17/00* (2006.01)
*G11B 20/10* (2006.01)
*H04L 12/835* (2013.01)

(52) U.S. Cl.
CPC .. *G11B 20/10527* (2013.01); *G11B 20/10222* (2013.01); *H04L 47/30* (2013.01)

(58) Field of Classification Search
CPC .............. G11B 27/00; G11B 20/10527; G11B 2020/10592; G11B 2020/1062; G11B 2020/10638; G11B 2020/10666; G11B 2020/10694; G11B 2020/10703; G11B 2020/1074; G11B 2020/10805; G11B 2020/10814; H04L 47/30
See application file for complete search history.

(56) References Cited

U.S. PATENT DOCUMENTS

| | | | | |
|---|---|---|---|---|
| 5,297,180 A | * | 3/1994 | Upp .......................... | G06F 5/06 370/516 |
| 6,252,919 B1 | | 6/2001 | Lin | |
| 6,757,348 B1 | | 6/2004 | Vila et al. | |
| 7,243,253 B1 | * | 7/2007 | McClary ................. | H04L 12/66 345/537 |

(Continued)

FOREIGN PATENT DOCUMENTS

| | | |
|---|---|---|
| EP | 2026331 | 2/2009 |
| WO | 0232054 | 4/2002 |

OTHER PUBLICATIONS

United Kingdom Patent Application No. GB 1321827.6 Search Report, dated May 28, 2014 (1 page).

*Primary Examiner* — Fan Tsang
*Assistant Examiner* — David Siegel
(74) *Attorney, Agent, or Firm* — Michael Best & Friedrich LLP

(57) ABSTRACT

The respective occupancies of a set of audio buffers are controlled via a common target occupancy value common to all the buffers in the set. This common target may take non-integral values. For each buffer, the difference is taken between the occupancy value of the buffer and the common target occupancy value. A sample is dropped or repeated as the difference exceeds half a sample. A recursive sum is formed of the fractional parts of the difference measures from the set of buffers and the recursive sum is used to adjust the common target occupancy value, within a selected range of values.

16 Claims, 4 Drawing Sheets

(56) References Cited

U.S. PATENT DOCUMENTS

2011/0235531 A1\* 9/2011 Vangal .................... H04L 47/30
                                                            370/252
2012/0017014 A1\* 1/2012 Shuholm ................. G06F 13/12
                                                            710/65

\* cited by examiner

ADJUSTING OCCUPANCIES OF A SET OF BUFFERS

FIELD OF INVENTION

The invention concerns the synchronisation of audio data; in particular the correction of delay errors introduced in asynchronous digital processing.

BACKGROUND OF THE INVENTION

The portrayal of audio 'scenes' by means of a plurality of audio channels is well-known. The use of two channels (stereo sound) is commonplace; the use of six or more channels is now expected in many applications, including television broadcasts. Such multi-channel audio systems require synchronisation between the constituent audio signals in order to provide the intended sound field in a listening environment. Typical systems for the production and distribution of multi-channel audio content make use of digital representations of audio samples. A delay difference of one digital sample period (typically 23 µs) between two constituent audio signals is unacceptable.

Many digital audio processes make use of asynchronous transport and processing systems where audio samples are processed at a rate different from that at which the samples are intended to be presented to a listener, and/or the rate at which the samples were acquired in a recording environment.

An important example is television production. The outputs from a number of microphones may be digitised as 16-bit words at a sample rate of, say 44.1 kHz; these audio words may be combined in a multiplex with 10-bit video samples at a total rate of, say 27 MWord/s; the audio words may then be de-multiplexed to an intermediate multiplex at, say 50 kWord/s; re-multiplexed into another 27 MWord/s video stream; and, finally, de-multiplexed to a nominal 44.1 kHz rate and output. Typically buffer stores are used to manage the handover between the parts of the system operating at different sample rates; if a sample is lost, or unintentionally duplicated, the buffer delay for the affected audio channel will differ from the buffer delay of other channels, and a lack of audio synchronism will result. The complex audio routing in modern audio-visual production requires the combination of audio and video sources from different sources, and changes to these combinations increase the possibility of loss or duplication of samples, with consequent introduction of relative delay differences between audio channels.

Typical buffer stores are controlled by input and output clock signals which control the 'writing' and 'reading' of data at the input and output respectively. The 'fullness', or occupancy of the buffer is the cumulative difference between the number of write clocks and the number of read clocks. It is usually arranged that buffers have some average occupancy that is appropriate to the expected frequency variations in the read and write clocks. This average occupancy represents the propagation delay of the buffer. Audio processes where different audio channels are separately buffered require a mechanism to ensure equal average buffer occupancy for the constituent audio channels of an audio scene.

SUMMARY OF THE INVENTION

A typical system is illustrated in FIG. 1. A set of digital audio signals (1) is created by a synchronous source process (2) that is controlled by a source clock (3). The set of digital audio signals (1) could represent the outputs from a set of microphones in a recording studio, and the source clock (3) could be a 44.1 kHz audio sampling clock.

An asynchronous process (4) processes the set of digital audio signals (1) using one or more clock signals unrelated to the source clock (3). The asynchronous process (4) could include: transport, including transport within a video data multiplex; switching and routing; and/or, gain adjustment and filtering.

The asynchronous process (4) outputs a set of digital audio signals (5) that are derived from the outputs (1) from the source process (2). Each of the processed audio signals (5) has an average sample rate equal to the frequency of the source clock (3), but there may be short-term changes in the sample rates, including differences between the instantaneous rates of the members of the set, so that audio samples that were time coincident at the output of the source process (2) are no longer time coincident at the output (5) of the asynchronous process (4).

A set of buffers (6) receives the set of processed audio signals (5), and the buffer outputs provide a set of synchronous data outputs (7). The outputs from the buffers (6) are controlled by a destination clock (8), so that the set of synchronous data outputs (7) represent co-timed audio samples at a sample rate set by the frequency of the destination clock (8). Typically the frequency of the destination clock (8) will be very similar (if not identical) to that of the source clock (3). Each of the set of buffers (6) will fill and empty according to the instantaneous data rate at its respective input and thus apply a varying delay, which compensates for the delay variation within the asynchronous process (4). However, the long term average delay of each buffer must be the same, so as to maintain the same delay for all the audio signals.

A known method of ensuring equal delays for an associated group of audio buffer stores is to set the buffers to a particular fullness at a particular time, for example when an equipment is switched-on, or when a new input signal is received. This technique has the disadvantage that any errors will remain until the next reset event. Regular resetting is possible, but it will typically introduce a data disturbance if it takes place at an arbitrary time.

Another technique is to monitor the long-term average occupancy of each buffer, and adjust any buffer whose occupancy differs from the intended level by more than some small tolerance margin. The tolerance margin reduces the need for corrections but allows a delay difference just less than the tolerance margin to persist indefinitely.

Buffer fill adjustment is often made by repeating or deleting audio samples. This is obviously undesirable as it represents a distortion of the audio signal. The audibility of these adjustments can be reduced by choosing the time of the adjustment by analysis of the audio signal, for example as described in European Patent EP 2 026 331, the content of which is hereby incorporated by reference.

There is thus a need for a method of maintaining equal propagation delay for a group of audio channels that are individually buffered, in a way which minimises the occurrence of buffer fill adjustments.

The invention consists in a method and apparatus for adjusting the respective occupancies of a set of buffers, where the occupancy for each respective buffer is adjusted toward a respective target occupancy for that buffer, and the target occupancy for each buffer includes a target value common to all the buffers in the set wherein the said target value is adjusted within a selected range of values in response to a summation of the set differences between the respective occupancy of each buffer and its respective target occupancy.

In certain embodiments the said summation is used to adjust the phase of a clock that is used to control the timing of buffered data output from at least one of the said buffers.

Suitably, the said summation is an average difference measure for the said set of buffers.

In a preferred embodiment, the summation is a recursive sum and each difference in the said set of differences is attenuated by a common proportionality factor prior to summation.

Advantageously each of the said differences is expressed as the sum of an integer number of samples and a fractional number of samples and only the fractional parts are summed.

And, the sum of the fractional parts is made in a circular number space so that an infinitely small increase above x results in a value x' that is less than x and an infinitely small decrease below y results in a value y' that is greater than y.

And preferably x' is greater than y and y' is less than x.

DETAILED DESCRIPTION OF THE INVENTION

Figure 1:
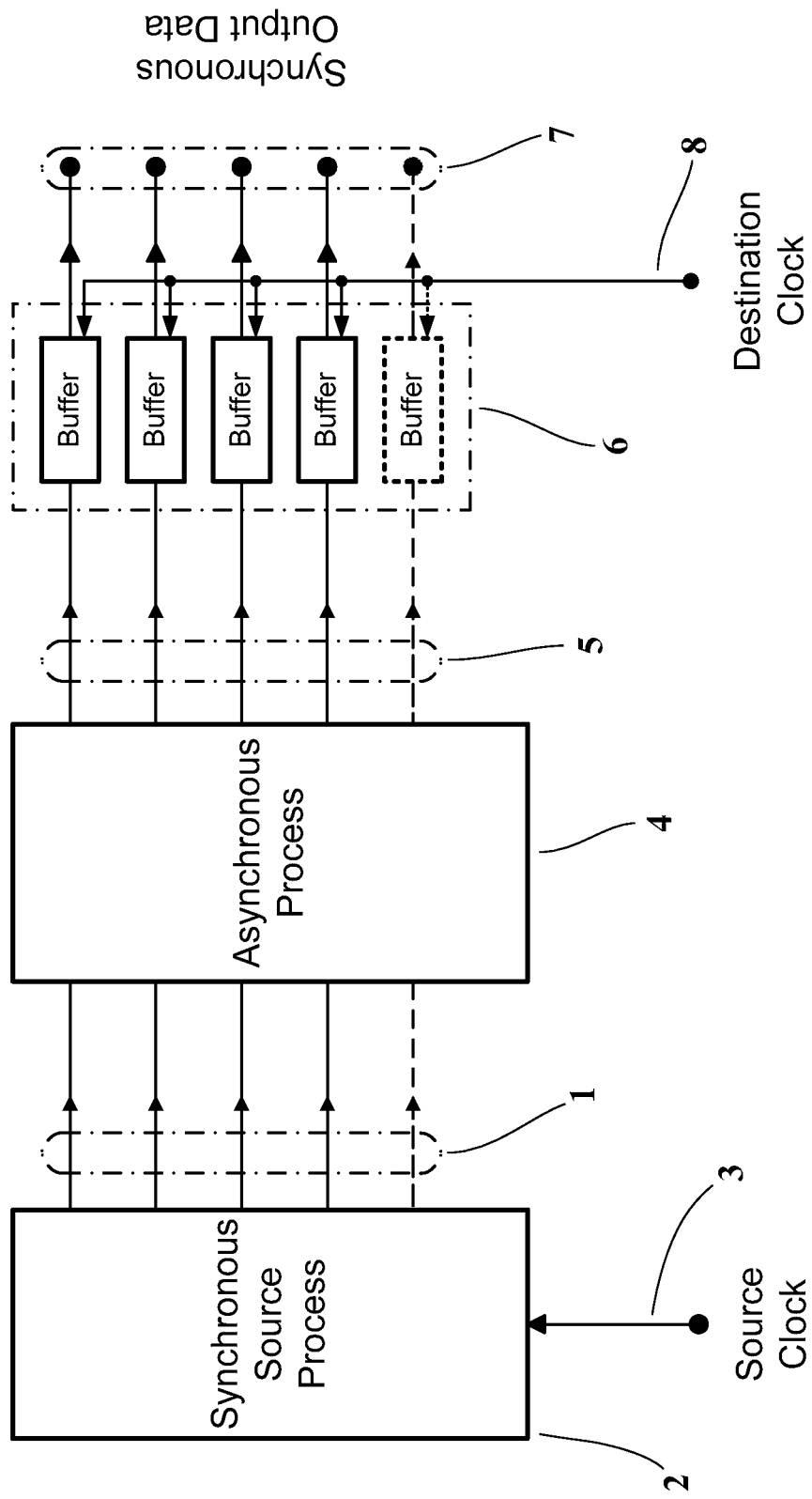
FIG. 1 shows a known system for re-synchronising data at the output of an asynchronous process.

An embodiment of the invention will be described with reference to FIG. 2. Audio data samples (200) are input to a buffer (201) as they are received from a prior audio process. Buffered audio samples (202) are output to a subsequent audio process when needed by that subsequent process. The occupancy of the buffer (201) is measured (203), and a buffer occupancy measure (204) is input to a low pass filter (205) to obtain a long-term average occupancy measure (206).

The long-term average occupancy measure (206) is compared, in a subtractor (207) with a 'target' occupancy value (208). Note that although the actual occupancy is an integer number of samples (the number of samples stored in the buffer) both the average occupancy and the target occupancy can be non-integer values. The sign and magnitude of the result of the subtraction (207) is analysed (209) to determine a buffer occupancy correction signal (210). When the long-term average occupancy (206) differs from the target occupancy value (208) by more than half a sample, the buffer occupancy correction signal (210) causes the buffer (201) to repeat or delete a sample so as to adjust its occupancy towards the target occupancy value (208).

The output from the subtractor (207) is also processed (211) to obtain the signed fractional part of the difference between the measured long-term average occupancy (206) and the target occupancy value (208). This signed fractional part (212) is calculated with respect to the nearest integer number of samples, and has a range of ±½ sample. For example, if the target occupancy is 32.8 samples, a measured occupancy of 33.7 samples would give a true difference of +0.9 sample, but this exceeds the range limit; it is therefore output from the process (211) as a value of −0.1. Similarly, a measured occupancy of 31.9 would give a value of +0.1.

A proportion of the signed fractional part (212) is added to an accumulator (213). The accumulator also receives proportions of signed fractional parts (214) from similar respective comparisons of long-term average occupancy with the target occupancy value (208) that have been made for buffers of other audio channels that are required to be co-timed with the buffered audio samples (202). A suitable proportion is 1/256 of the value of each signed fractional part. The processing within the box (240) in FIG. 2 is repeated for each of these co-timed audio channels, and the respective signed fractional errors comprise the set of fractional parts (214).

The accumulator (213) operates in a circular number space (commonly known as 'modulo N' accumulation), so that when a maximum accumulation value is reached, a further increment results in 'overflow' to a lower accumulated value; and, when a minimum value is reached, a further decrement results in 'underflow' to a higher accumulated value. Typically the range of the accumulator (213) is from +¾ to −¾ samples (but see below and FIG. 3 for further detail).

The target occupancy level (208) is obtained by adding the output (215) of the accumulator (213) to a fixed, integer value (216) in an adder (217). The integer value (216) is chosen to avoid underflow or overflow of the buffer (201) and the corresponding buffers for the signals that are required to maintain synchronism with the buffered audio data (202). The choice is made from consideration of the sizes of the buffers and the expected differences between their input and output sample rates. For example, if increases and decreases in the short-term data rate at the buffer input are equally likely, the integer value (216) should be equal to half the maximum number of samples that can be stored by each buffer.

Because the set of audio data streams whose buffers are controlled by the target occupancy value (208) start off in synchronism at their point of origination, and end up in synchronism their destination, their respective required buffer delays (equivalent to average occupancy levels) are likely to be equal. It is also possible that the phase relationship between the original audio sampling clock and the final audio destination clock will be such as to make the required target fill value a non-integer value that changes only slowly (if at all). The invention enables a non-integer occupancy level to persist without adjustment; and, if an adjustment is needed, the adjustment is communicated to all the buffers simultaneously via a change in the accumulated fractional error (215).

Figure 3:
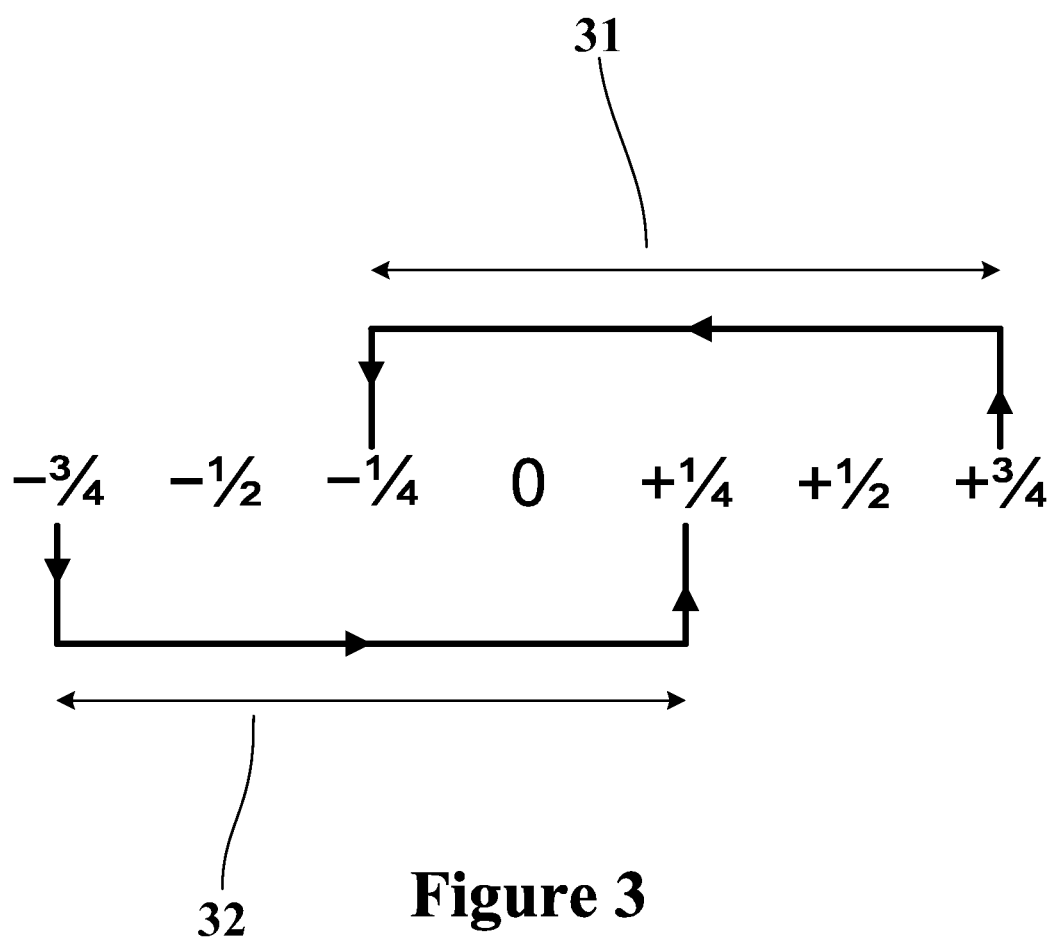
FIG. 3 shows two number ranges in a circular number space.

As explained above, the adjustment range provided by the accumulator (213) is limited. This reduces the possibility of changes to the integer part of the target occupancy (208). This possibility is further reduced by applying hysteresis to the accumulation range as shown in FIG. 3. As shown in the Figure, a total accumulator range of ±¾ sample can comprise two, overlapping ranges of ±½ sample, the range (31) centred on +¼, and the range (32) centred on −¼. An increment above +¾ causes a jump back to −¼; and, a decrement below −¾ causes a jump forward to +¼. The ranges overlap because the value jumped back to in the case of increasing accumulator input is lower than the value jumped forward to in the case of decreasing accumulator input. Continuously increasing input causes the accumulator to remain in the higher range (31); and, continuously decreasing input causes the accumulator to remain in the lower range (32).

Figure 2:
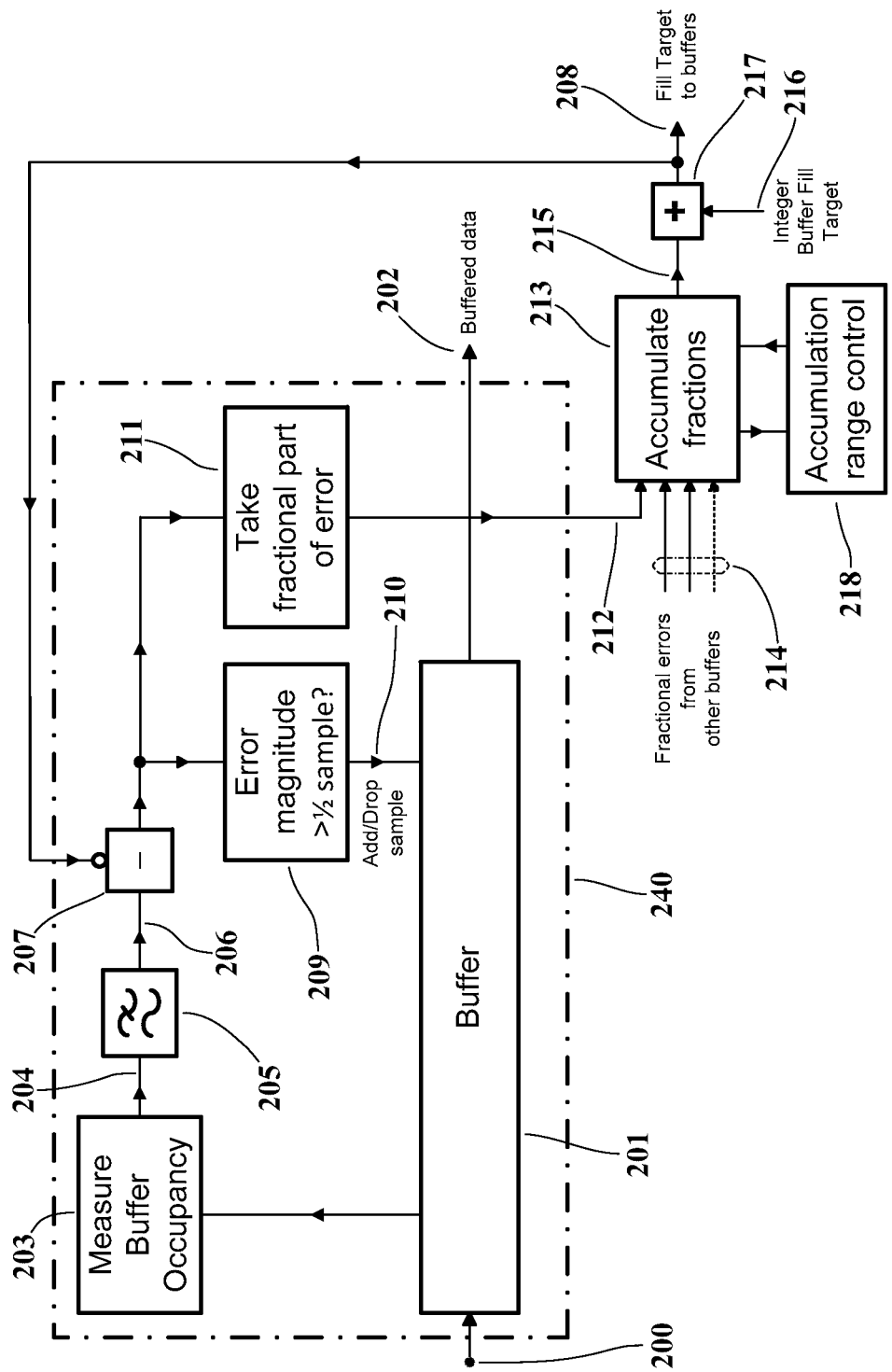
FIG. 2 shows a system according to an embodiment of the invention for controlling the occupancy of a buffer forming part of a set of buffers.

In the system of FIG. 2, an accumulation range control block (218) monitors the value of the accumulation (215) and adjusts the accumulator to keep it within the two overlapping ranges with appropriate hysteresis as described above.

The proportional contributions of fractional errors (212) and (214) to the accumulator (213) cause it to form a recursively filtered error measure, that approaches the average fractional error over time. An alternative approach is to divide each of the fractional errors (212) and (214) by the total number of contributions, and to reset the accumulator (213) to the centre of the current accumulation range before accumulating each set of fractional errors, so as to form an average value directly. In this case the dynamic performance of the buffer adjustment process is determined by the low-pass filter (205) and the frequency at which new average values are computed.

The process shown in FIG. 2 can operate periodically, perhaps as a background process in a software control system. The frequency of re-evaluation of the target occupancy value (208) can be chosen depending on the likelihood of the need for buffer adjustment and the length of time for which errors can be allowed to persist. The frequency of buffer adjustment by the buffer occupancy correction signal (210) can be different from the frequency of re-evaluation of the target occupancy value (208).

The transient response of the buffer occupancy control loop, via the low-pass filter (205) and the occupancy correction signal (210), can be improved by compensating the filtered occupancy value (206) immediately a sample is added or dropped from the buffer, or the target occupancy value (208) is changed. If the buffer occupancy is known to vary cyclically, perhaps because of the frequency difference between the destination sample rate and the clock rate of earlier asynchronous processing, the low pass filter (205) could be replaced by a process that measures the occupancy at a particular point in the cycle, the peak for example.

In the above described process the constituent buffers of a set of buffers are maintained at the same, non-integer, average occupancy. It may be known that the data route via a particular buffer includes a fixed delay which is different from the delays of other routes. In this case the target occupancy value for that particular buffer can be 'corrected' to allow for this different routing by adding or subtracting a suitable, integer or non-integer value that corresponds to the number of sample periods of delay difference.

Figure 4:
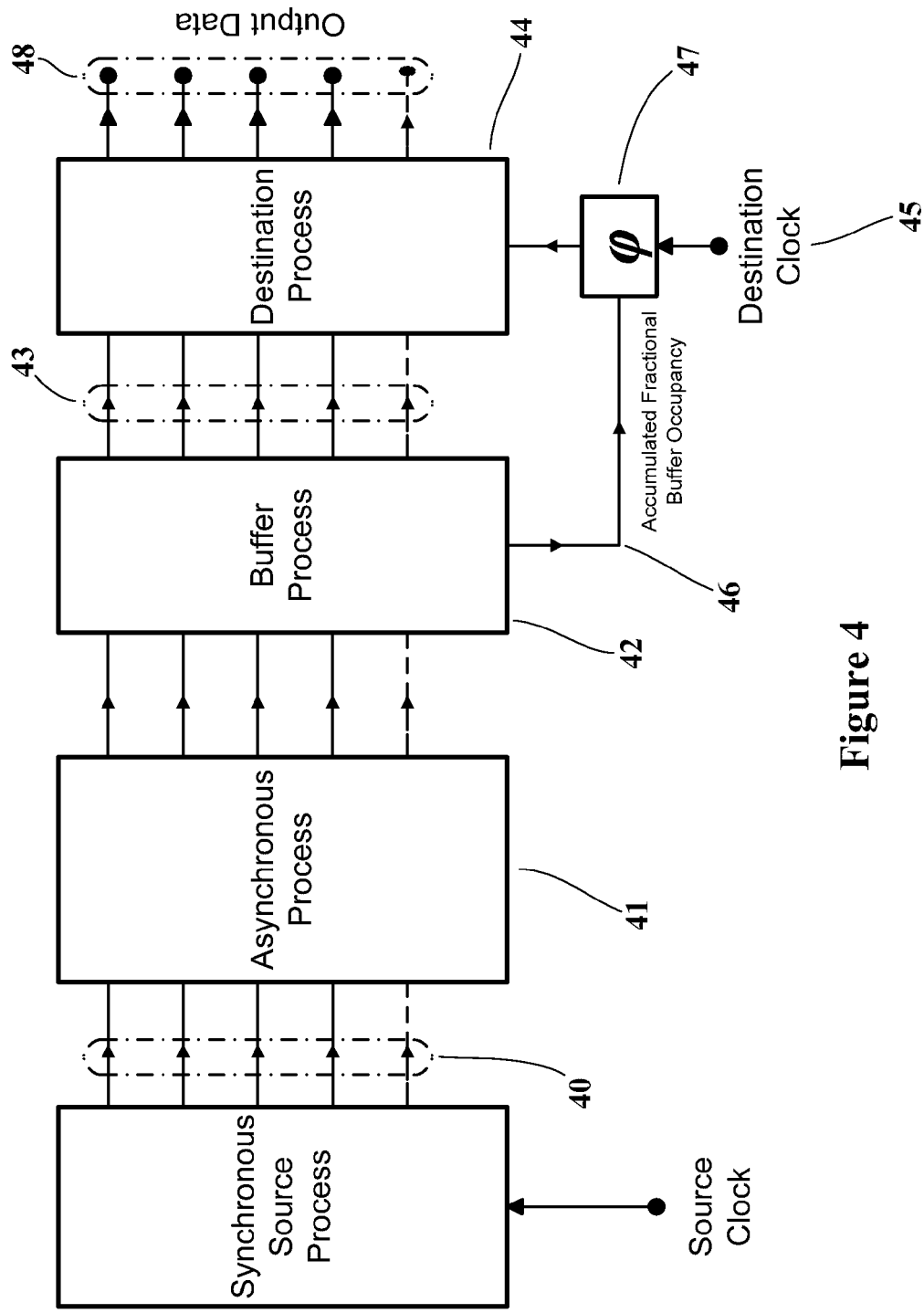
FIG. 4 shows a system according to an embodiment of the invention for re-synchronising data at the output of an asynchronous process.

The accumulated fractional occupancy value (215) gives a measure of the phase difference between the source clock and clock that controls the output of data from the buffers; it can be used to adjust the phase of this output data clock, as shown in FIG. 4.

Referring to FIG. 4, a set of co-timed, synchronous data signals (40) passes through asynchronous processing (41) and is buffered, according to the system of FIG. 2, in a buffer process (42). The resulting set of buffered data signals (43) is received by a destination process (44).

The destination process (44) is controlled by a destination clock (45) that has a frequency equal to the sample rate of the individual data signals comprising the set (43). The destination clock (45) controls the timing of the output of the buffered data signals (43) from the buffer process (42).

The accumulated fractional occupancy value (215) that controls the buffer process (42) is output from that process at (46), and controls a clock phase adjustment process (47).

If the accumulated fractional occupancy value (215) is positive, indicating that, on average, data is requested from the buffers later than an integer number of sample periods after entering a buffer, then the phase of the destination clock is advanced so that data is requested earlier. And similarly, if the accumulated fractional occupancy value (215) is negative, the phase of the destination clock is retarded. This feedback process maintains a fixed phase relationship between the original source clock and the destination process clock.

If the accumulated fractional buffer occupancy value (46) is a true average expressed in units of one sample, it is equal to the required phase adjustment; for example an accumulation of ¾ sample represents 270° phase.

The destination process (44) may not have a constant data rate at its output (48). The process could, for example, be a process that embeds audio samples in the blanking period of a video multiplex. And, the destination clock (45) could be an audio sample rate derived as a (non-integer) multiple of the video line-rate. The operation of the destination clock phase adjustment process will avoid the phase ambiguity inherent in the derivation of the audio sampling clock from the video rate by ensuring a fixed phase relationship with the original audio sampling clock.

The principle of the invention is to set a target buffer occupancy for a set of associated signals (if necessary, making allowance for known differences between the set of signal routes) based on the measured average occupancies. The assumption that, in the absence of errors or disturbances, no samples are lost or duplicated enables the phase of the output sampling clock to be related to the source sampling clock. The invention can be used even when the frequency of the output sampling clock differs from that of the source sampling clock. The set of output data streams are maintained synchronous and co-timed.

As the skilled person will appreciate, the invention can be implemented in many ways. The buffer correction process via the occupancy correction signal (210) may use a wider or narrower tolerance than ±½ sample, and the tolerance may varied according to the nature of the buffered data. The accumulation of signed fractional occupancies may be allowed a range wider or narrower than ±¾ sample; and, the permitted range may or may not be symmetrical about zero. Buffer occupancy values can be represented at varying levels of precision using analogue signals or digital values according to any of the well-known binary numbering systems including: binary, offset binary, two's complement, signed binary, etc. Fractional buffer occupancy values may be represented by suitably-scaled integers for processing. The processes of the invention may operate continuously or intermittently, and software may be used to implement all or part of a system according to the invention.

The invention claimed is:

1. A method for controlling a buffer apparatus, the buffer apparatus comprising a set of buffers for holding samples, each buffer having an occupancy value and being adapted for the dropping or adding of a sample to adjust the occupancy value of the buffer, the method comprising the steps of:

providing an adjustable common target occupancy value common to all the buffers in the set;

adjusting the occupancy of each buffer toward a respective buffer target occupancy value for that buffer which is based on said common target occupancy value;

forming for each buffer a difference measure from the difference between the occupancy value of the buffer and the buffer target occupancy value for the buffer;

forming a summation of the set of difference measures; and adjusting said adjustable common target occupancy value within a selected range of values in response to said summation, in which the summation is a recursive sum and each difference measure is attenuated by a common proportionality factor prior to summation.

2. The method according to claim 1 in which the said summation is used to adjust the phase of a clock that is used to control the timing of buffered data output from at least one of the said buffers.

3. The method according to claim 1 in which the said summation is an average difference measure for the said set of difference measures.

4. The method according to claim 1 in which each of the said differences between the occupancy value of the buffer and the buffer target occupancy value for the buffer is expressed as the sum of an integer number of samples and a fractional number of samples and said difference measure comprises the fractional number of samples and said summation is a recursive sum with each difference measure attenuated by a common proportionality factor prior to summation.

5. A method for controlling buffer apparatus, the buffer apparatus comprising a set of buffers for holding samples, each buffer having an occupancy value and being adapted for the dropping or adding of a sample to adjust the occupancy value of the buffer, the method comprising the steps of:

providing an adjustable common target occupancy value common to all the buffers in the set;

adjusting the occupancy of each buffer toward a respective buffer target occupancy value for that buffer which is based on said common target occupancy value;

forming for each buffer a difference measure from the difference between the occupancy value of the buffer and the buffer target occupancy value for the buffer;

forming a summation of the set of difference measures; and adjusting said adjustable common target occupancy value within a selected range of values in response to said summation in which each of the said differences between the occupancy value of the buffer and the buffer target occupancy value for the buffer is expressed as the sum of an integer number of samples and a fractional number of samples and said difference measure comprises the fractional number of samples.

6. The method according to claim 5 in which the sum of the fractional parts is made in a circular number space so that an infinitely small increase above x results in a value x' that is less than x and an infinitely small decrease below y results in a value y' that is greater than y.

7. The method according to claim 6 in which x' is greater than y and y' is less than x.

8. A buffer apparatus for use in the synchronisation of audio or other data, the apparatus comprising:

a set of buffers for holding samples, each buffer having a buffer occupancy control for comparing the occupancy of the buffer with a buffer occupancy target value based on a common buffer occupancy target common to the buffers of the set, for causing the dropping or adding of a sample where required and for outputting a fractional buffer occupancy error; and an accumulator arrangement for receiving said fractional buffer occupancy errors from the respective buffers of the set and deriving said common buffer occupancy target value, wherein said buffer occupancy control forms an average of the occupancy of the buffer and compares the average occupancy with said buffer occupancy target value to form a buffer error magnitude.

9. The apparatus according to claim 8, wherein said buffer occupancy control causes the dropping or adding of a sample when said buffer error magnitude exceeds a threshold.

10. The apparatus according to claim 9, wherein said threshold which is one half sample.

11. The apparatus according to claim 8, wherein said accumulator provides a fractional buffer occupancy target value which is added to a fixed integer buffer target occupancy value to form said common buffer occupancy target value.

12. A synchronisation apparatus comprising:

a buffer apparatus including, a set of buffers for holding samples, each buffer having a buffer occupancy control for comparing the occupancy of the buffer with a buffer occupancy target value based on a common buffer occupancy target common to the buffers of the set, for causing the dropping or adding of a sample where required and for outputting a fractional buffer occupancy error; and an accumulator for receiving said fractional buffer occupancy errors from the respective buffers of the set and deriving said common buffer occupancy target value, an output clock for controlling the outputting of data; and a clock phase adjuster which receives an accumulated fractional buffer occupancy error from said accumulator arrangement and in response adjusts the phase of said output clock.

13. The synchronisation apparatus according to claim 12 in which said phase is advanced where said accumulated fractional buffer occupancy error is positive and retarded where said accumulated fractional buffer occupancy error is negative.

14. A non-transitory computer program product adapted to cause a programmable apparatus to implement a method comprising the steps of:

providing an adjustable common target occupancy value common to all buffers in a set of buffers;

adjusting the occupancy of each buffer toward a respective buffer target occupancy value for that buffer which is based on said common target occupancy value;

forming for each buffer a difference measure from the difference between the occupancy value of the buffer and the buffer target occupancy value for the buffer;

forming a summation of the set of difference measures; and adjusting said adjustable common target occupancy value within a selected range of values in response to said summation in which the summation is a recursive sum and each difference measure is attenuated by a common proportionality factor prior to summation.

15. A non-transitory computer program product according to claim 14 in which each of the said differences between the occupancy value of the buffer and the buffer target occupancy value for the buffer is expressed as the sum of an integer number of samples and a fractional number of samples and said difference measure comprises the fractional number of samples.

16. A non-transitory computer program product according to claim 14 in which each of the said differences between the occupancy value of the buffer and the buffer target occupancy value for the buffer is expressed as the sum of an integer number of samples and a fractional number of samples and said difference measure comprises the fractional number of samples and said summation is a recursive sum with each difference measure attenuated by a common proportionality factor prior to summation.

\* \* \* \* \*